US006579925B1

(12) United States Patent
Fortuyn et al.

(10) Patent No.: US 6,579,925 B1
(45) Date of Patent: Jun. 17, 2003

(54) POLY(ARYLENE ETHER)-POLYSTYRENE COMPOSITION

(75) Inventors: Johannes E. Fortuyn, Bergen op Zoom (NL); Torben Paul Kempers, Bergen op Zoom (NL); Juraj Liska, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/506,077

(22) Filed: Feb. 16, 2000

(51) Int. Cl.[7] ................................................ C08K 3/18
(52) U.S. Cl. ...................... 524/433; 524/430; 524/437
(58) Field of Search ................................ 524/430, 437, 524/433

(56) References Cited

U.S. PATENT DOCUMENTS

| | | | |
|---|---|---|---|
| 2,619,478 A | 11/1952 | Wehr et al. | 260/33.6 |
| 4,102,850 A | 7/1978 | Cooper et al. | 260/33.6 |
| 4,365,038 A | 12/1982 | Cooper et al. | 260/29.1 |
| 4,529,652 A | 7/1985 | Bussink et al. | 428/379 |
| 5,199,184 A | 4/1993 | Rosse | 34/10 |
| 5,296,563 A | 3/1994 | Gottschalk et al. | 525/397 |
| 5,326,817 A | 7/1994 | Orikasa et al. | 525/64 |
| 5,714,550 A | 2/1998 | Shaw | 525/393 |
| 5,852,135 A | 12/1998 | Kanai et al. | 525/398 |

FOREIGN PATENT DOCUMENTS

| | | |
|---|---|---|
| EP | 0102133 | 3/1984 |
| EP | 0389837 | 10/1990 |
| GB | 2295155 A | 5/1996 |
| JP | 50001149 | 1/1975 |
| JP | 60090257 | 5/1985 |
| JP | 02-265960 A | 10/1990 |
| JP | 03-152155 A | 6/1991 |
| JP | 04-170447 | 6/1992 |
| JP | 08-048841 | 2/1996 |
| WO | WO 95/34594 | 12/1995 |

*Primary Examiner*—Peter D. Mulcahy

(57) ABSTRACT

Excellent physical properties and reduced dust formation are exhibited by thermoplastic compositions comprising a poly (arylene ether); a polystyrene; a metal hydroxide; and optionally, a rubber material. The thermoplastic compositions are particularly useful for molding automobile interior parts.

22 Claims, No Drawings

POLY(ARYLENE ETHER)-POLYSTYRENE COMPOSITION

BACKGROUND OF THE INVENTION

The present invention relates to poly(arylene ether)-polystyrene compositions, and especially relates to poly(arylene ether)-polystyrene compositions having reduced dust formation during pelletizing.

In majority of cases, thermoplastics are processed via compounding and molding operations. A compounded formulation is often isolated in the form of granulate via pelletizing. Pelletizing is the operation during which a plastic string coming out of a die of a compounding machine (e.g., an extruder) is chopped via mechanical forces into granules. These granulation forces can cause the release of small pieces of material from the surface of the string, forming dust. Dust formation is an industrial issue not only during the pelletizing step but also during transportation and further processing such as feeding to a molding machine.

U.S. Pat. No. 5,199,184 to Rosse describes a method of handling plastic granules, especially polyester granules, in which the plastic granules are first crystallized then dried in a fluidized bed such that dust particles are removed from the granules, blown upward and deposited in a cyclone.

U.S. Pat. No. 5,296,563 to Gottschalk et al. describes a process of preparing thermoplastic molding materials whereby the poly(phenylene ether) component, initially present in pulverulent form, is subjected to compacting or sintering under pressure to decrease the proportion of free fine material.

The methods known in the art require special equipment achieve dust reduction. There continues to be a need for thermoplastic compositions that are inherently less susceptible to dust formation.

BRIEF SUMMARY OF THE INVENTION

Reduced dust formation is exhibited by a thermoplastic composition comprising: (a) about 20 to about 80 weight percent of a poly(arylene ether); (b) about 5 to about 80 weight percent of a polystyrene; (c) optionally, about 0.1 to about 15 weight percent of a rubber material; and (d) about 0.1 to about 5 weight percent of a metal hydroxide compound capable of releasing water during a compounding or molding step; wherein all weight percents are based on the weight of the entire composition.

DETAILED DESCRIPTION OF THE INVENTION

A thermoplastic composition exhibiting reduced dust formation comprises: (a) about 20 to about 80 weight percent of a poly(arylene ether); (b) about 5 to about 80 weight percent of a polystyrene; (c) about 0.1 to about 15 weight percent of a rubber material; and (d) about 0.1 to about 5 weight percent of a metal hydroxide compound capable of releasing water during a compounding or molding step; wherein all weight percents are based on the weight of the entire composition.

The composition comprises at least one poly(arylene ether) resin. Although all conventional poly(arylene ether)s can be employed with the present invention, polyphenylene ethers ("PPE") are preferred. Poly(arylene ether)s per se, are known polymers comprising a plurality of structural units of the formula:

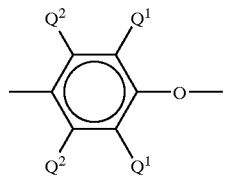

wherein for each structural unit, each $Q^1$ is independently halogen, primary or secondary lower alkyl (that is, alkyl containing from one to about seven carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether)s in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether)s generally have a number average molecular weight of about 3,000 to about 40,000 and a weight average molecular weight of about 20,000 to about 80,000, as determined by gel permeation chromatography. The poly(arylene ether) generally has an intrinsic viscosity of about 0.10 to about 0.60 deciliters per gram (dL/g), preferably about 0.29 to about 0.48 dL/g, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90 weight percent of the polymer, may contain at least one of said aminoalkyl-containing and 4-hydroxybiphenyl end groups.

It will be apparent to those skilled in the art from the foregoing that the poly(arylene ether)s include all those presently known, irrespective of variations in structural units or ancillary chemical features.

A suitable amount of poly(arylene ether) in the composition is about 20 to about 80 weight percent, with a preferred amount being about 20 to about 70 weight percent. An amount of about 30 to about 60 weight percent is more preferred.

The composition further comprises at least one polystyrene. The term "polystyrene" as used herein includes polymers prepared by methods known in the art including bulk, suspension and emulsion polymerization, which contain at least 25 weight percent of structural units derived from a monomer of the formula:

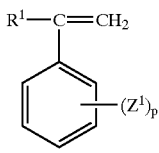

wherein $R^1$ is hydrogen, lower alkyl or halogen; $Z^1$ is vinyl, halogen or lower alkyl; and p is from 0 to 5. These resins include homopolymers of styrene, chlorostyrene and vinyltoluene; random copolymers of styrene with one or more monomers illustrated by acrylonitrile, butadiene, alpha-methylstyrene, ethylvinylbenzene, divinylbenzene and maleic anhydride; and rubber-modified polystyrenes comprising blends and grafts, wherein the rubber is a polybutadiene or a rubbery copolymer of about 70 to about 98 weight percent styrene and about 2 to about 30 weight percent diene monomer. Polystyrenes are known to be miscible with poly(arylene ether)s in all proportions, and the composition may contain polystyrene in an amount of about 20 to about 80 weight percent and more often about 20 to about 70 weight percent, based on the weight of the entire composition. A polystyrene amount of about 30 to about 60 weight percent is preferred.

The composition optionally further comprises at least one rubber material. Suitable rubber materials include those comprising a styrenic block copolymer. Styrenic block copolymers suitable for the polymer compositions according to the invention comprise blocks built up from a vinyl aromatic compound, for example, styrene, and blocks built up from an olefinic compound, for example butadiene, ethylene and/or propylene. Suitable are linear block copolymers, radial teleblock copolymers and so-called "tapered" block copolymers, i.e. block copolymers built up from blocks which are bonded together via a "random" copolymer of the vinyl aromatic compound and (hydrogenated) diene compound. The styrenic block copolymers may be unsaturated, i.e., they may contain residual olefinic unsaturation. Alternatively, the styrenic block copolymers may be saturated, i.e., they may be essentially free of olefinic unsaturation.

Suitable unsaturated styrenic block copolymers may have number average molecular weights of about 50,000 to about 200,000, with molecular weights of about 80,000 to about 150,000 being preferred, and molecular weights of about 100,000 to about 130,000 being more preferred. The unsaturated styrenic block copolymer may be present in an amount of about 0.1 to about 10 weight percent, preferably about 0.3 to about 5 weight percent, more preferably about 0.5 to about 2 weight percent, based on the weight of the entire composition. Suitable saturated styrenic block copolymers may have number average molecular weights of about 50,000 to about 500,000, with molecular weights of about 100,000 to about 400,000 being preferred and molecular weights of about 200,000 to about 300,000 being more preferred. The optional styrenic block copolymers may be present in an amount of about 1 to about 15 weight percent, preferably about 3 to about 10 weight percent, more preferably about 5 to about 8 weight percent, based on the weight of the entire composition.

Suitable styrenic block copolymers are commercially available from a number of sources, including Phillips Petroleum under the trademark SOLPRENE®, Shell Chemical Company under the trademark KRATON®, and Kuraray under the trademark SEPTON®. Suitable materials include the unsaturated styrenic block copolymers in the KRATON® D series (styrene-butadiene-styrene (SBS) and styrene-isoprene-styrene (SIS)), and the saturated styrenic block copolymers in the KRATON® G series (styrene-ethylene/butylene-styrene (SEBS) and styrene-ethylene/propylene-styrene (SEPS)). Especially preferred are the materials sold as KRATON® G 1650 and 1651.

In addition to the poly(arylene ether), the polystyrene, and the optional rubber material, the composition further comprises a metal hydroxide compound capable of releasing water during the compounding and or molding step. Suitable metal hydroxide compounds include aluminum hydroxide, magnesium hydroxide, calcium hydroxide, their respective hydrates, and the like. Aluminum hydroxide and its hydrates are preferred. Metal hydroxide compounds are commercially available. For example, suitable aluminum hydroxides may be obtained from Alcoa Corporation under the grade names C333, M2B and M15B. The metal hydroxide may be employed in an amount effective to reduce dust formation during granulation of the resin composition and/or handling of the resultant granules. The amount of metal hydroxide is generally in the range of about 0.1 to about 5 weight percent, preferably about 0.5 to about 2 weight percent, more preferably about 0.75 to about 1.5 weight percent, based on the weight of the entire composition.

The composition may optionally comprise one or more mineral oils to improve the low temperature impact strength of the composition. Useful mineral oils are of the type known as white mineral oils. They are a complex mixture of saturated paraffinic and naphthenic hydrocarbons and are preferably free of aromatic compounds, sulfur-containing compounds, acids, and other impurities. White mineral oils are available in a wide range of viscosities, and the useful oils have Saybolt viscosities ranging from about 50 to about 350 centipoise at 100° F. Examples of suitable oils are the white mineral oils sold under the trademarks PROTOL®, GLORIA®, and KAYDOL® by Witco Chemical Company, and the mineral oils sold under the trademark FLEXON® by Esso Nederland BV. A particularly preferred mineral oil is FLEXON® 834. A more detailed description of useful mineral oils can be found in U.S. Pat. No. 2,619,478.

One or more mineral oils may be employed in the composition at from 0 to about 5 weight percent, preferably about 0.1 to about 2.5 weight percent, more preferably about 0.25 to about 1 weight percent.

The composition preferably contains one or more antioxidants. Suitable antioxidants include organophosphites, for example, tris(nonyl-phenyl)phosphite, tris(2,4-di-tert.-butylphenyl)phosphite, bis(2,4-di-tert.-butylphenyl) pentaerythritol diphosphite or distearyl pentaerythritol diphosphite; hindered phenols, such as alkylated monophenols, polyphenols and alkylated reaction products of polyphenols with dienes, such as, for example, tetrakis [methylene(3,5-di-tert.-butyl-4-hydroxyhydrocinnamate)] methane, 3,5-di-tert.-butyl-4-hydroxyhydrocinnamate octadecyl, butylated reaction products of para-cresol and dicyclopentadiene, alkylated hydroquinones, hydroxylated thiodiphenyl ethers, alkylidene-bisphenols, O-, N- and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl) dithioterephthalate, esters of beta-(3,5-di-tert.-butyl-4-hydroxyphenyl)-propionic acid with monohydric or polyhydric alcohols, esters of beta-(5-tert.-butyl-4-hydroxy-3-methylphenyl)-propionic acid with monohydric or polyhydric alcohols, amides of beta-(3,5-di-tert.-butyl-4-hydroxyphenyl)-propionic acid, and hindered phenol-substituted triazine triones such as 1,3,5-tris(3,5-di-tert.-butyl-4-hydroxybenzyl)-s-triazinetrione; and esters of thioalkyl or thioaryl compounds, such as, for example, distearylthiopropionate, dilaurylthiopropionate, ditridecylthiodipropionate. Preferred antioxidants include organo-phosphites and hindered phenols. Highly preferred antioxidants include tetrakis[methylene(3,5-di-tert.-butyl-4-hydroxyhydrocinnamate)] methane sold by Ciba Specialty Chemicals under the trademark IRGANOX® as IRGANOX® 1010, and 1,3,5-tris(3,5-di-tert.-butyl-4-hydroxybenzyl)-s-triazinetrione sold by Ciba Specialty Chemicals under the trademark IRGANOX® as IRGANOX® 3114, as well as antioxidant combinations comprising at least one of these.

The antioxidant, when employed, may be present in an amount of about 0.1 to about 3 weight percent, preferably about 0.25 to about 2.5 weight percent, more preferably about 0.5 to about 2 weight percent, based on the weight of the entire composition.

Various additives may be used in the formulation such as flame retardants, stabilizers, pigments, reinforcing agents, processing aids, plasticizers, and the like.

Different inorganic additives may be used in poly(arylene ether) resins as reinforcing agents, heat stabilizers, colorants (organic and inorganic pigments, dyes) and electroconductive additives. Some representative examples cover the compounds such as various types of silicas and aluminas, zeolites, titanium dioxide, potassium titanate and titanate whiskers, calcium carbonate, calcium sulfates, kaolin, talc, wollastonite, limestone products, mica, barium sulfate, carbon blacks, glass beads and fibers, etc. Especially preferred additives are the filamentous and chopped glass fibers. Such glass fibers may be untreated or, optionally, treated with a silane or titanate coupling agent, and are well known in the art and widely available from a number of manufacturers. Such additives can be used in amounts of about 0.1 to about 50 weight percent, preferably about 0.5 to about 30 weight percent and more preferably about 1 to about 20 weight percent.

Many stabilizers used in plastics can be part of a poly (arylene ether) formulation, e.g. UV stabilizers, radical and hydroperoxide scavengers such as hindered phenols, hindered amines, benzofuranones, benzotriazoles, benzophenones, hydroxylamines, organic phosphites and phosphates, thioethers, thioesters, zinc oxide, zinc sulfide, and the like.

Other additives which can be used in the composition include: lubricants to enhance mold release and flow such as metallic stearates, hydrocarbons (including polyolefines and Teflon), fatty acids and fatty alcohols; exothermic and/or endothermic blowing agents; halogen based, metal hydrate based or phosphorous based flame retardants; plasticizers which increase flexibility, workability and distensibility such as glutarates, adipates, azelates, sebacates, phthalates, etc.; and adhesion promoters (epoxies, phenolics, acrylates, terpenes, etc).

The composition can be prepared by combining the poly(arylene ether), the polystyrene, the rubber compound, and the metal hydroxide compound, as well as any optional ingredients, using any of the known compounding equipment and procedures. For example, a dry pre-blend of all ingredients can be formed; the pre-blend can be heated to a temperature sufficient to cause melting (e.g., at about 250° C. to 350° C.); and the melted pre-blend can be extruded in a single or twin screw extruder. The extruded material can be chopped, cut or ground to smaller size and injection molded (e.g., about 250° C. to 320° C.) to desired shape and size. Alternatively, the various components can be blended at different times during the extrusion process. Steam stripping and vacuum venting may advantageously be used during the compounding and/or extruding steps to remove the generated volatiles.

All cited patents are incorporated herein by reference.

The invention is further illustrated by the following non-limiting example.

EXAMPLE

Formulations A–E were prepared from a common base formulation consisting of 40 weight percent poly(phenylene ether) having intrinsic viscosity 0.4 (chloroform, 25° C.) obtained as PPO® 803 from GE Plastics; 30 weight percent crystal clear polystyrene, number average molecular weight 180,000 g/mol, obtained as Lacqrene 1810 from Elf Atochem; 10 weight percent glass fiber, diameter of 14 micrometers, obtained as CS122Y 14P from Owens-Corning; as well as a standard set of additives consisting of stabilizers, carbon black, an adhesion promoter, and a release agent.

As specified in the Table, formulations A–E varied with respect to their rubber material, presence or absence of mineral oil, presence or absence of aluminum hydroxide, and type of antioxidant. The rubber material was selected from Kraton G 1650 (a styrene-ethylene/butylene-styrene (SEBS) polymer, weight average molecular weight=103,000, obtained from Shell Chemical Co.), Kraton D1102CS (a styrene-butadiene-styrene (SBS) copolymer, weight average molecular weight=126,000, obtained from Shell Chemical Co.), or Kraton G 1651 (a styrene-ethylene/butylene-styrene (SEBS) polymer, weight average molecular weight 270,000, obtained from Shell Chemical Company). Mineral oil, used at either 0 or 0.5 weight percent, was obtained as FLEXON® 834 from Esso Nederland BV. Aluminum hydroxide (Al(OH)$_3$), used at either 0 or 1.0 weight percent, was obtained as Alcoa C333. Antioxidant, present at 1.5 weight percent, was either IRGANOX® 1010 or a 50:50 weight fraction blend of IRGANOX® 1010 and IRGANOX® 3114.

Ingredients were dry-blended on a PapenMeyer mixer and the resultant formulation was extruded on a twin screw 28 mm Werner-Pfleiderer extruder at 300° C. using steam stripping and vacuum venting. The extrudate was chopped into pellets and molded on a Stork 90T injection molding machine at a temperature of 285° C. into test specimens. The test specimens were used to measure emission, odor and delamination.

Dust generation was measured by sieving about 400 grams of granulate in a vibrating sieve for 10 minutes and removing dust. The remaining granulate was sieved for an additional 45 minutes to obtain fresh dust generation, and dust from both sievings was combined and weighed. Dust is expressed as a weight percent (wt %) of the starting amount of granulate. The dust test was performed in duplo on each material.

Flow, mechanical and thermal properties were measured according to the following standards.

Emission tests were conducted using headspace gas chromatography according to the procedure described in VDA Recommendation 277 published by the Organization of the German Automobile Industry (VDA). A total of two grams of sample material, in pieces ranging from about 10 to about 25 milligrams, was cut from a molded disc, and heated for 5 hours at 120° C. in a 20 milliliter headspace vial. The released vapor was analyzed by gas chromatography with flame ionization detection (FID). All peak areas were integrated and from the total peak area the emission was calculated and expressed in units of microgram carbon per gram material ($\mu$gC/g). Calibration was performed with an external standard of acetone in n-butanol. A value less than 50 $\mu$gC/g is desired.

Odor tests were conducted according to the procedure described in VDA Recommendation 270 published by the Organization of the German Automobile Industry (VDA). A 50 cubic centimeter (cm$^3$) sample of molded material was heated for 2 hours at 80° C. in a 1 liter closed glass flask. Samples were acclimatized for 5 minutes before odor evaluation. Samples were prepared in duplo and tested by two different teams of 3 persons. Odor ratings were assigned according to the following scale:

1=no perception of odor

2=just perceptible odor, not annoying

3=perceptible odor, not annoying

4=annoying odor

5=very annoying odor

6=unbearable odor.

Odor ratings less than 4 are desirable, with ratings less than 3 preferred.

Delamination was judged visually. Tensile strength measurements were conducted according to International Standards Organization (ISO) 527 and reported in units of megaPascals (MPa). Three point bending measurements were conducted according to ISO 178 and reported in units of MPa. Vicat-B/120 measurements were conducted according to ISO 306 and reported in units of degrees centigrade (°C.). Izod impact was measured according to ISO 180 and reported in units of kilojoules per square meter (kJ/m$^2$). Melt volume ratio (MVR) was measured according to ISO 1133 at 300° C. and 2.16 kilograms and expressed in units of milliliters per 10 minutes (mL/10 min).

Formulation variations and test results are presented below in the Table.

TABLE

| | FORMULATION | | | | |
|---|---|---|---|---|---|
| | A | B | C | D | E |
| COMPOSITION | | | | | |
| Kraton G1650 (weight percent) | 5.0 | 0 | 0 | 0 | 0 |
| Kraton D1102CS (weight percent) | 0.7 | 0 | 0 | 0 | 0 |
| Kraton G 1651 (weight percent) | 0 | 6.6 | 6.6 | 6.6 | 6.6 |
| Mineral oil (weight percent) | 0 | 0 | 0.5 | 0.5 | 0.5 |
| Al(OH)$_3$ (weight percent) | 0 | 0 | 0 | 1.0 | 1.0 |
| IRGANOX ® 1010 (weight percent) | 1.5 | 1.5 | 1.5 | 1.5 | 0 |
| IRGANOX ® 1010/ IRGANOX ® 3114 (50:50) (weight percent) | 0 | 0 | 0 | 0 | |
| PROPERTIES | | | | | |
| Dust (%) | 0.095 | 0.126 | 0.145 | 0.063 | 0.069 |
| Emission ($\mu$gC/g) | 180 | 71 | 63 | 72 | 65 |
| Odor | 5 | 4.5 | 4 | 3.5 | 4 |
| Delamination | yes | no | no | no | no |
| Tensile | | | | | |
| Modulus (MPa) | 4280 | 4140 | 4130 | 4245 | 4230 |
| Max. Stress (MPa) | 75.9 | 76.3 | 76.6 | 76.9 | 76.9 |
| Elongation (%) | 3.2 | 2.9 | 2.9 | 2.9 | 2.8 |
| Three Point Bending | | | | | |
| E-Mod-2 (MPa) | 3470 | 3760 | 3690 | 3750 | 3790 |
| Max. Stress (MPa) | 110.1 | 115.3 | 113.7 | 117.7 | 118.2 |
| Vicat-B/120 (° C.) | 144 | 140 | 141 | 143.2 | 144.8 |
| Izod Impact (kJ/m$^2$) | 24.6 | 23.3 | 26.6 | 22.6 | 25.1 |
| MVR (300° C., 2.16 kg) mL/10 min) | 20.8 | 23.5 | 21.2 | 21.5 | 21.3 |

The results demonstrate that formulations D and E, containing 1.0 weight percent aluminum hydroxide, exhibit reduced dust content while maintaining good odor, emission, and delamination, as well as a suitable profile of flow, mechanical and thermal properties. The results also show that incorporation of a high molecular weight saturated rubber (and in formulations B–E) is associated with reduced emission and absence of delamination.

The reduction in dust formation in formulations with aluminum hydroxide was unexpected and is not well understood. While we do not wish to be bound to any particular explanation, we speculate that it was achieved via formation of a more ductile surface that is resistant toward shear forces during pelletizing and handling.

What is claimed is:

1. A thermoplastic composition, comprising:
   (a) about 20 to about 80 weight percent of a poly(arylene ether);
   (b) about 5 to about 80 weight percent of a polystyrene;
   (c) about 0.1 to about 15 weight percent of a rubber material; and
   (d) about 0.1 to about 5 weight percent of a metal hydroxide compound capable of releasing water during a compounding or molding step or both;
   wherein all weight percents are based on the weight of the entire composition.

2. The thermoplastic composition of claim 1, wherein the metal hydroxide compound is aluminum hydroxide.

3. The thermoplastic composition of claim 1, wherein the metal hydroxide compound is present at about 0.5 to about 2 weight percent.

4. The thermoplastic composition of claim 1, wherein the rubber material comprises a saturated styrenic block copolymer.

5. The thermoplastic composition of claim 4, wherein the saturated styrenic block copolymer has a number average molecular weight of about 50,000 to about 500,000.

6. The thermoplastic composition of claim 1, further comprising about 0.5 to about 30 weight percent of glass fibers.

7. The thermoplastic composition of claim 1, further comprising about 0.1 to about 2.5 weight percent of a mineral oil.

8. The thermoplastic composition of claim 1, further comprising about 0.1 to about 3 weight percent of an antioxidant.

9. The thermoplastic composition of claim 8, wherein the antioxidant comprises a hindered phenol.

10. An article molded from the thermoplastic composition of claim 1.

11. An automobile interior part molded from the thermoplastic composition of claim 1.

12. A thermoplastic composition, comprising the reaction product of:
   (a) about 20 to about 80 weight percent of a poly(arylene ether);
   (b) about 5 to about 80 weight percent of a polystyrene;
   (e) about 0.1 to about 15 weight percent of a rubber material; and
   (d) about 0.1 to about 5 weight percent of a metal hydroxide compound capable of releasing water during a compounding or molding step;
   wherein all weight percents are based on the weight of the entire composition.

13. A method for making a thermoplastic composition, comprising:
   dry-blending about 20 to about 80 weight percent of a poly(arylene ether); about 5 to about 80 weight percent of a polystyrene; about 0.1 to about 15 weight percent of a rubber material; and about 0.1 to about 5 weight percent of a metal hydroxide compound capable of releasing water during a compounding or molding step or both, wherein all weight percents are based on the weight of the entire composition, to form a pre-blend;
   melting the pre-blend;
   extruding the melted pre-blend.

14. The method of claim 13, wherein the melted pre-blend is extruded at a temperature of about 250° C. to about 350° C.

15. The method of claim 13, wherein the melted pre-blend is extruded using steam stripping and vacuum venting.

16. A method for reducing dust formation during granulation of a thermoplastic resin composition wherein the method comprises adding a metal hydroxide compound to the composition in an amount of about 0.1 to about 5 percent by weight of the total composition during a compounding step prior to granulation, wherein the metal hydroxide compound is capable of releasing water during the compounding step wherein the thermoplastic resin composition comprises:
   (a) about 20 to about 80 weight percent of a poly(arylene ether); and
   (b) about 5 to about 80 weight percent of a polystyrene.

17. The method of claim 16, wherein the thermoplastic resin composition comprises:
   (a) about 20 to about 80 weight percent of a poly(arylene ether);
   (b) about 5 to about 80 weight percent of a polystyrene;
   (c) about 0.1 to about 15 weight percent of a rubber material; and
   (d) about 0.1 to about 5 weight percent of a metal hydroxide compound capable of releasing water during a compounding or molding step or both;
   wherein all weight percents are based on the weight of the entire composition.

18. The method of claim 16, wherein the metal hydroxide compound comprises at least one of aluminum hydroxide, magnesium hydroxide, or calcium hydroxide.

19. The method of claim 16, further comprising stream stripping, vacuum venting, or steam stripping and vacuum venting.

20. A thermoplastic resin composition made by the method of claim 16.

21. A thermoplastic composition, comprising:
   about 20 to about 80 weight percent of a poly(arylene ether);
   about 5 to about 80 weight percent of a polystyrene;
   about 0.1 to about 5 weight percent of a metal hydroxide compound capable of releasing water during a compounding or molding step or both;
   wherein all weight percents are based on the weight of the entire composition.

22. A thermoplastic composition, comprising the reaction product of:
   (a) about 20 to about 80 weight percent of a poly(arylene ether);
   (b) about 5 to about 80 weight percent of a polystyrene;
   (c) about 0.1 to about 5 weight percent of a metal hydroxide compound capable of releasing water during a compounding or molding step;
   wherein all weight percents are based on the weight of the entire composition.

* * * * *